United States Patent
Lee et al.

(10) Patent No.: US 7,076,048 B2
(45) Date of Patent: Jul. 11, 2006

(54) AGENT-BASED MULTIMEDIA COMMUNICATION SYSTEM THAT SUPPORTS WEB TELEPHONY CALL MODEL

(75) Inventors: Kuo Chu Lee, Princeton Junction, NJ (US); Shaomin Mo, Monmouth Junction, NJ (US); Juan Yu, Dranbury, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 300 days.

(21) Appl. No.: 09/960,803

(22) Filed: Sep. 21, 2001

(65) Prior Publication Data
US 2003/0059028 A1    Mar. 27, 2003

(51) Int. Cl.
*H04L 12/66* (2006.01)
(52) U.S. Cl. .............................. 379/265.01; 379/265.02; 379/265.09
(58) Field of Classification Search ................................ 379/265.01–265.14, 266.01–266.1
See application file for complete search history.

(56) References Cited

U.S. PATENT DOCUMENTS

| | | | |
|---|---|---|---|
| 5,991,392 | A | 11/1999 | Miloslavsky |
| 5,991,394 | A | 11/1999 | Dezonno et al. |
| 5,995,606 | A | 11/1999 | Civanlar et al. |
| 5,999,612 | A | 12/1999 | Dunn et al. |
| 6,005,847 | A | 12/1999 | Gilbert et al. |
| 6,005,932 | A | 12/1999 | Bloom |
| 6,014,437 | A | 1/2000 | Acker et al. |
| 2002/0057678 | A1* | 5/2002 | Jiang et al. |
| 2003/0088421 | A1* | 5/2003 | Maes et al. |
| 2003/0097457 | A1* | 5/2003 | Saran et al. |

* cited by examiner

*Primary Examiner*—William J. Deane, Jr.
(74) *Attorney, Agent, or Firm*—Harness, Dickey & Pierce, PLC

(57) ABSTRACT

An agent-based telephony system is provided for establishing a call between two or more telephony devices interconnected through an automated call dispatch server. The automated call dispatch server includes a call control agent for processing call requests; a call resource management agent in communication with the call control agent for allocating and controlling the resources needed to establish a call between telephony devices; and a resource control agent in communication with the call resource management agent for providing a hardware-dependent interface to the telephony devices.

14 Claims, 3 Drawing Sheets

AGENT-BASED MULTIMEDIA COMMUNICATION SYSTEM THAT SUPPORTS WEB TELEPHONY CALL MODEL

BACKGROUND AND SUMMARY OF THE INVENTION

The present invention relates generally to computer telephony, and more particularly, to an agent-based multimedia communication architecture for integrating circuit switched telephony systems and IP-based packet switching systems while providing scalability, programmability and interoperability.

Telephony systems generally rely on conventional circuit switched network architectures. However, the current technology trend is to move from these conventional circuit switched telephony systems to IP-based packet switching systems. Given this current trend, it is necessary to develop the next generation multimedia communication system that supports a telephony call model while taking advantage of both of these technologies.

Therefore, it is desirable to provide an integrated multimedia communication architecture that supports a telephony call model as well as IP-based data communication sessions. The architecture should further provide a modular and simplified service model that supports rapid development, installation and provisioning of services. The simplified service model is based on dynamically upgradeable service logic programming modules that can be remotely administered. To support such dynamically upgradeable service logic requires innovation in call processing architecture, especially in how to provide a highly integrated and yet decomposable module interconnection interfaces. In addition, the agent based multimedia communication architecture should utilize an unified shared object repository access interface to support the storage and synchronization of call objects and service parameters. The new object model provides XML based interface for object caching and distributed repositories. Based on such an open object interface, the system is scaleable as well as easy to operate and maintain.

The multimedia communication architecture of the present invention addresses these issue by adopting the emerging trend of an agent-based system design. According to one aspect of the invention, an agent-based telephony system is provided for establishing a call between two or more telephony devices interconnected through an automated call dispatch server. The automated call dispatch server includes a call control agent for processing call requests; a call resource management agent in communication with the call control agent for allocating and controlling the resources needed to establish a call between telephony devices; and a resource control agent in communication with the call resource management agent for providing a hardware-dependent interface to the telephony devices.

For a more complete understanding of the invention, its objects and advantages refer to the following specification and to the accompanying drawings.

DETAILED DESCRIPTION OF THE PREFERRED EMBODIMENTS

Figure 1:
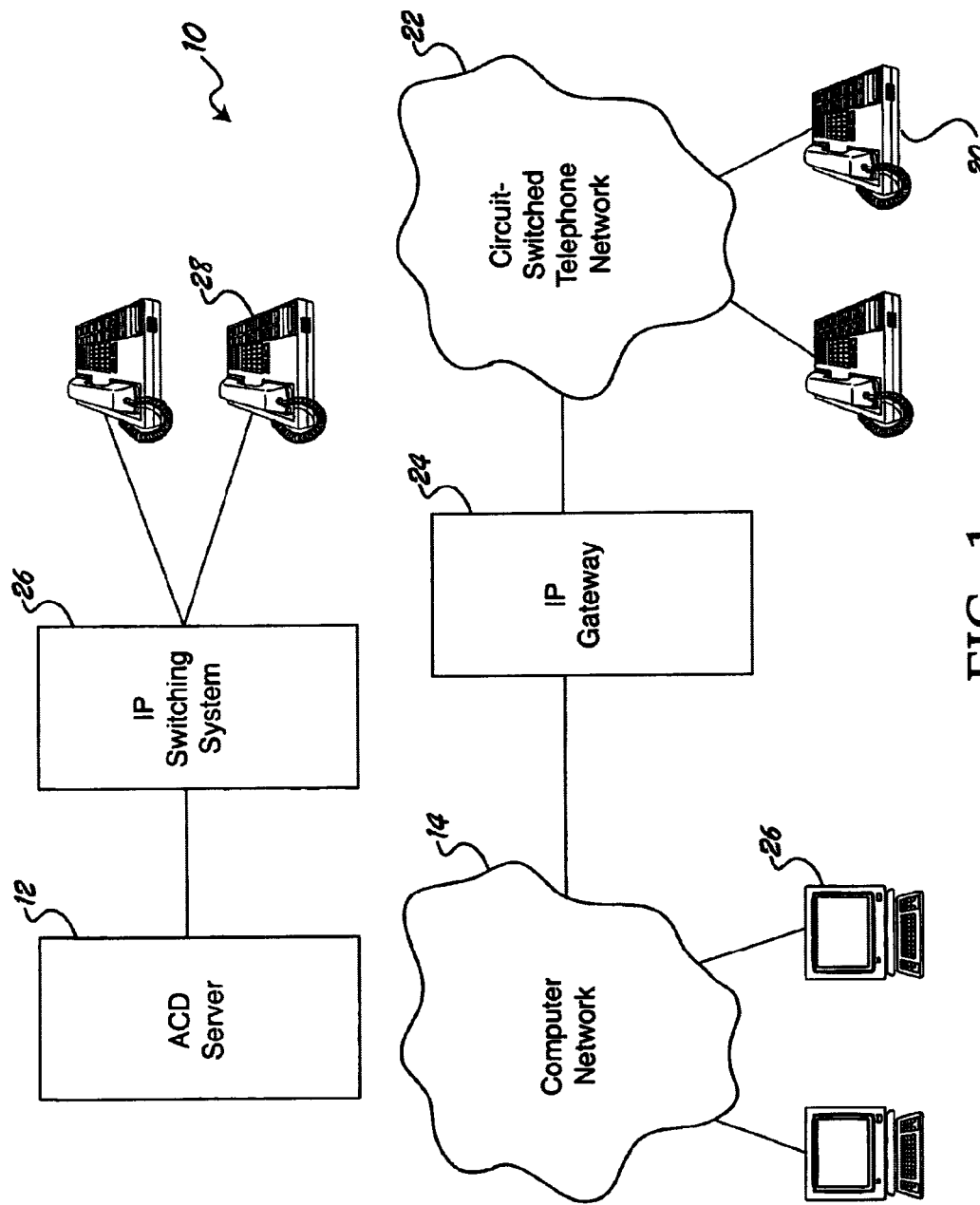
FIG. 1 is a diagram depicting an exemplary hardware configuration for a multimedia communication system embodying aspects of the present invention.

FIG. 1 illustrates an exemplary hardware configuration for a multimedia communication system 10 embodying aspects of the present invention. It is envisioned that a call may be established between two or more telephony devices which are interconnected through an automated call dispatch (ACD) server 12. For illustration purposes, the ACD server 12 is coupled to a privately controlled computer network 14. However, it is readily understood that ACD server 12 may also be connected to a publicly accessed computer network, such as the Internet. In a preferred embodiment, the computer network is a packet-switched network utilizing the Internet Protocol (IP).

The ACD server 12 may be accessed from different types of telephony devices. For instance, a call may be established using a conventional telephone handset 20 suitably connected to a circuit-switched telephone network 22. An IP gateway 24 is used to interconnect the public telephone network 22 with the computer network 14 which is coupled to the ACD server 12. Alternatively, the ACD server 12 may be suitably connected to a private branch exchange (PBX) which in turn is connected to the public telephone network 22.

In another instance, a call may be established using a computing terminal 26 suitably connected to the computer network 14. In this case, the computing terminal is operative to establish a Voice over Internet Protocol (VoIP) call through the use of the ACD server 12. In other words, the users voice is digitized and transmitted as data packets over the computer network to another telephony device.

Lastly, the ACD server 12 may be suitably connected to an IP-based switching system 26 which in turn is directly connected to one or more conventional telephone handsets 28. In either of these instances, a call between two or more telephony devices is established through the ACD server 12. Much of the functionality of the agent-based telephony call system of the present invention resides on the ACD server 12. Accordingly, details of the ACD server 12 are provided below.

Figure 2:
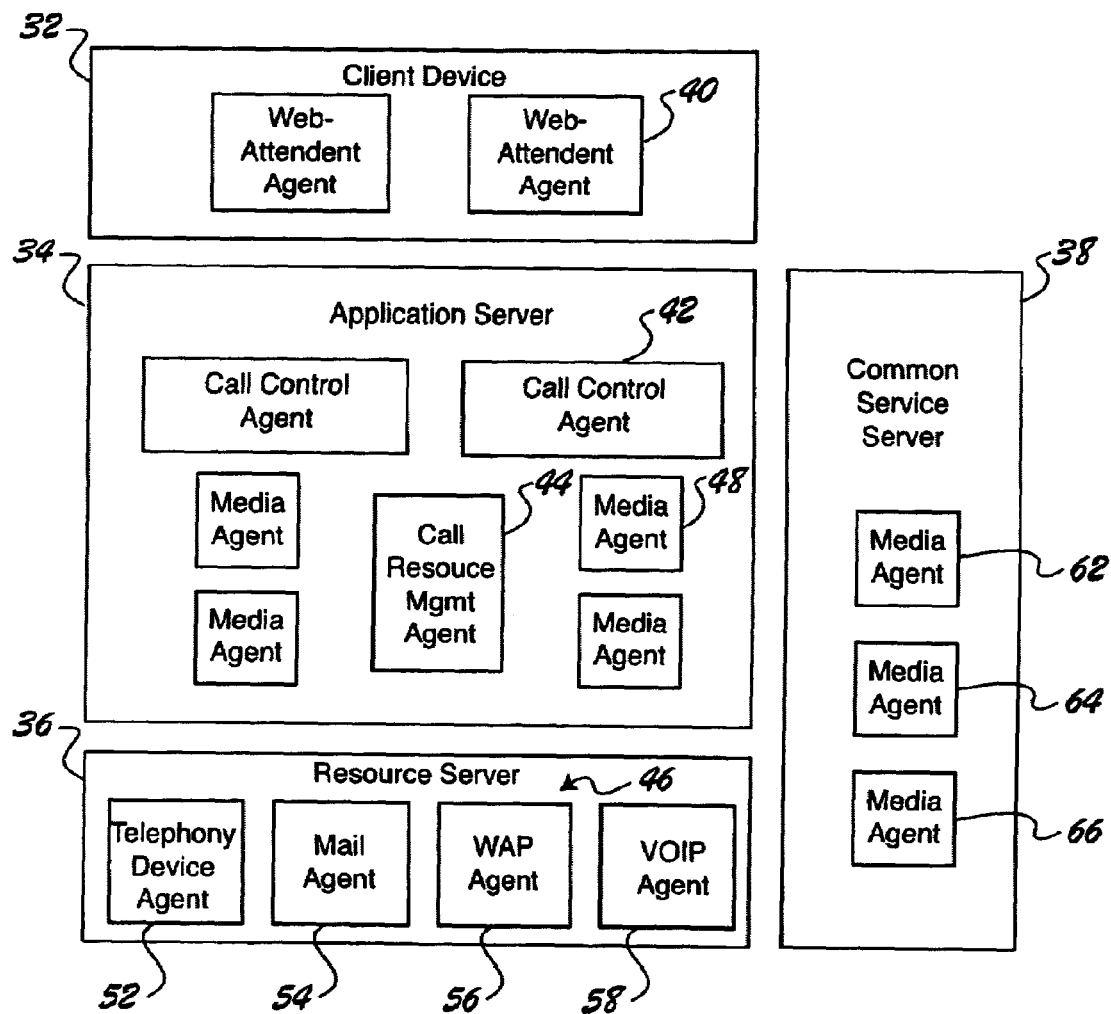
FIG. 2 is a block diagram illustrating presently preferred software architecture for the telephony call system of the present invention.

A software platform 30 for the telephony call system of the present invention is shown in FIG. 2. The telephony call system is based on a cooperative agent model that is designed to address the service programmability problem. Cooperative agents emphasize autonomy and cooperation in order to perform various tasks. Autonomy is the ability to make independent decisions; whereas cooperation is the ability to communicate and interact with other entities in the system. One skilled in the art will readily recognize that other attributes may be associated with the cooperative agents.

In applying this model to the present invention, application and resource management functions are decomposed into multiple software execution threads, where each execution thread is referred to as an agent. Referring to FIG. 2, the agents reside in one of four logical locations: the client device 32, the application server 34, the resource server 36, and the common service server 38. It is envisioned that each server may physically reside on the same computing device or on two or more different computing devices. In a preferred embodiment, each of the logical servers physically reside on the ACD server 12.

A web-attendent agent 40 may be downloaded from the application server 34 to a remote Web browser residing on the client device 32. The primary task of the web-attendent agent 40 is to provide an user interface for controlling the call at the client device 32. Thus, the web-attendent agent 40 interacts with the application server 34. Although some types telephony devices support the downloading of the web-attendent, other types of telephony devices, such as a conventional telephone handset, are simple used in conjunction with the client device 32. However, it should be noted that the web-attendent is not required to place or to receive a call in the present invention, but is merely an optional tool used to provide enhanced call functionality as well to integrate into the call other types of multimedia (e.g., email messaging, video streaming or web browsing).

Agents handling call control and resource management are located on the application server 34. The call control agent 42 generally processes each call request received by the ACD server. When a call control agent 42 receives a call request, it creates a call object and invokes service processing logic in order to decide how to process the call. The call control agent 42 then sends the call request to the call resource management agent 44. The call resource management agent 44 will follow the specification associated with the call object to allocate and control the resources for establishing the physical connections for the call. To do so, the resource management agent 44 invokes one or more of the resource control agents 46 residing on the resource server 36.

Media agents 48 also reside on the application server 34. Media agents are designed to provide Web-oriented multimedia services, such as email, video streaming and Web browsing. Each media agent 48 is responsible for one type of media service under the control of one call control agent 42. In this way, one or more multimedia services may be incorporated into the call.

Resource control agents 46 divide the control functions for each different type of physical device into different agents. In other words, each resource control agent 46 provides an open hardware-dependent interface which enables it to control the hardware devices associated with the call request. Some exemplary types of resource control agents may include a telephony device agent 52, a mail agent 54, a Wireless Application Protocol (WAP) agent 56 and a VoIP agent 58.

For illustration purposes, additional description is provided for the telephone device agent 52. The telephony device agent 52 typically supports a line board, an extension board, and other similar devices. For outgoing calls, the telephone device agent 52 may receive the logical trunk handler and then make the outgoing call. Alternatively, it may use TAPI to seize a PBX line and then make the outgoing call. For incoming calls, the telephony device agent 52 detects incoming call messages, creates a call object and then sends the call object to the call control agent 42. Although not limited thereto, other functions supported by the telephony device agent 52 may include connecting two telephony devices in a PBX, connecting a telephony device to an IP gateway channel, and connecting telephony device to a media processing device.

Agents designed to provide common services to agents on the application server 34 are located on the common service server 38. These agents may include a directory agent 62, a resource pool agent 64, and a queue agent 66. Exemplary functions for each of these common service agents have been provided below. For instance, the directory agent 62 may implement the following functions: maintain an internal user directory for this system, interface with any external directories (e.g., LDAP), provide methods for accessing shared objects, provide methods for getting terminals, provide methods for getting addresses and provide methods for getting system configuration data. In contrast, the resource pool management agent 64 may implement the following functions: initializing the logic resource pools by pooling the hardware devices (e.g., get all the cards and ports information), listing all resource pools and resource types in the system, getting a certain type of an available resource from resource pools, returning a resource to the resource pools, and monitoring and setting the status of all resources in the system. Lastly, the message queue agent 66 may implement the following functions: enque scheduled requests, deque scheduled requests, enque messages and events, deque messages and events, clear/reset message queues, and create/delete message queues. It is envisioned that other types of service agents providing other types of functions may also be incorporated into the system.

In summary, agents of different types implement different functions in the above-described cooperative agent model. In accordance with the present invention, this model has been used to design a telephony call system. As a result, functions are mostly isolated within the system. Since the agents are dynamically loaded into the system, they can be modified in run time mode without affecting other agents. This is very important because it supports the delivery of new or modified functions into the system. In addition, a software architecture that supports the use of multiple agents to process a service request allows for the decomposition of the more complex service features. This "divide and conquer" approach of complex functions facilitates rapid software development. It also provides maximum degrees of interoperability needed to communicate with hardware and software provided by external vendors.

Agents communicate with each other through the use of messaging and shared objects. One skilled in the art will readily recognize that the software architecture of the present invention supports an asynchronous messaging mechanism that facilitates partitioning of loosely dependent functions into multiple agents. In addition, the software architecture also supports two fundamental types of shared objects. The first type of object is a call object. A call object encapsulates the data and methods pertaining to the call. The second type of object is the service definition object. A service definition object contains information about common behavior (i.e., rules) that define services and service features supported by the system.

Figure 3:
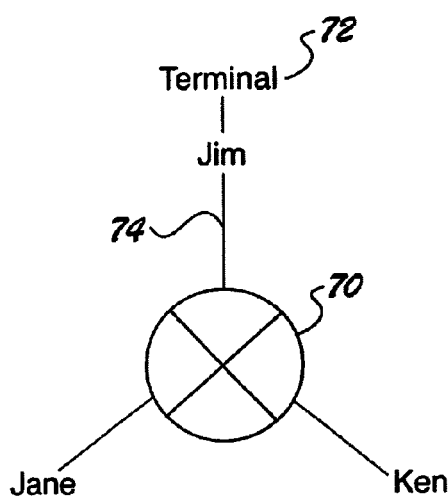
FIG. 3 is a diagram illustrating a call object which represents an exemplary conference call in accordance with the present invention.

FIG. 3 shows an example of a call object representing a conference call. The conference call consists of three participants: Jim, Ken and Jane. Generally, the call object specifies all of the information related to the call. More specifically, the conference call node 70 defines the configuration of the connections between the participants. For instance, the call object defines the terminals 72 and links 74 that are involved in a call. Since multiples terminals may be attached to a single calling address (e.g., a telephone handset and a facsimile machine), the call object specifies the type of terminal used by each participant. The call may also be established over different types of links (e.g., a conventional telephone network link or an IP-based telephone link). Similarly, the call object specifies the type of link for each connection involved in the call. The conference call node 70 may also include parameters for multiple functions, such as switch, media processing (i.e., voice bridging) and network connections. A preferred implementation of the call object is provided in Appendix A.

A service definition object defines the service logic of different service features. The purpose of the service definition object is to represent the service features in such a way that the user will be able to modify the feature parameters. Therefore, the service definition object is created dynamically by a service editor. As will be apparent to one skilled in the art, the service editor may be one of various commercially available development tools. Once created, the service definition object is dynamically loaded into the system. The application program designer can then dynamically link and load the object to implement programmable services. In addition, the application program designer can design the object to provide an access interface for run time users. The ability to allow users to modify a service definition object directly is the key to direct manipulation of the programmable services.

Service logic programs (SLP) are dynamically loaded classes that implement service control logic needed for different types of telephony service features. A service programmer may use a particular service logic program (SLP) to instantiate an SLP object which implements the service feature. For instance, a call screening service or a dynamic call routing service may be service features that are implemented as SLPs. In order to utilize the service feature, the service programmer further generates a class file and implements the logic which can be invoked by the call control agent. In the preferred embodiment, the service definition object of the present invention provides the following SLPs: service profile, originating call treatment service logic (OCTSL), terminating call treatment service logic (TCTSL) and network routing service logic (NRSL). One of the key feature of this system is to support the management of SLPs using precise XML interface definition so that the SLP can be managed as a service data that can be upgraded by either user or service administrators directly.

Figure 4:
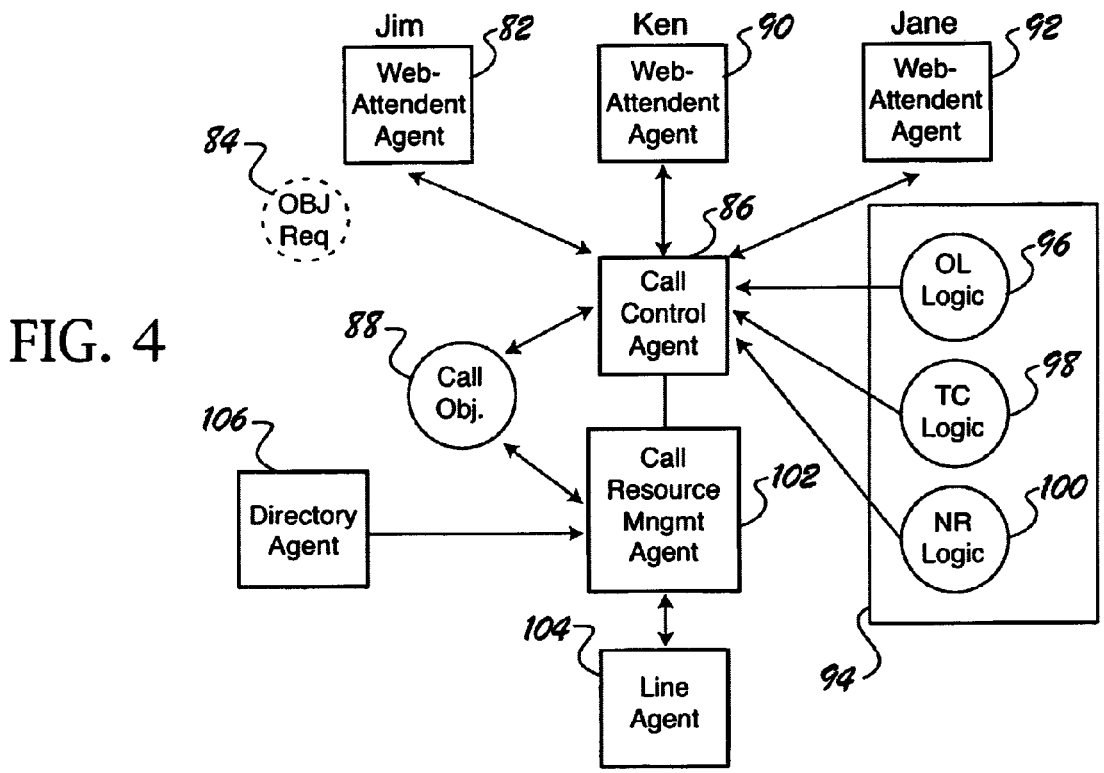
FIG. 4 is a block diagram illustrate how an exemplary conference call is implemented using the telephony call system of the present invention.

FIG. 4 illustrate an exemplary conference call service implemented using the telephony call system of the present invention. First, Jim initiates a conference call involving Ken and Jane. To do so, Jim activates a web-attendant agent 82 from the user interface of his telephony device. The web-attendant agent creates a request for a conference call object 84 and sends it for processing to the ACD server 12. In response thereto, a call control agent 86 is invoked at the ACD server.

The call control agent 86 instantiates a conference call object 88 based on the request from the web-attendant agent 82 and then extracts the requested participants of the conference call from the conference call object 88. The call control agent 86 then passes a handle of the conference call object 88 to the web-attendant agents 90 and 92 for each of the requested participants, Ken and Jane. In response to the handle, each web-attendant agent registers a trigger to the conference call object 88. The purpose of the triggers is to execute a routine that will notify each web-attendant agent about any changes to the conference call object 88 residing on the ACD server. Each web-attendant agent will also monitor events generated by its corresponding user.

The call control agent 86 continues processing the call request. For instance, the call control agent 86 will access the originating call treatment service logic 96 residing on the service definition object 94 in order to determine the outgoing call treatments for the originating user, Jim. The originating call treatment service logic takes care of the caller privilege. It is the first step of the call processing logic. It verifies the user call request against the current call states and decides whether it is able to execute the request. Illegal user requests are rejected at this early stage.

The call control agent 86 may also access the terminating call treatment logic 98 to determine whether a requested participant can accept the call. The terminating call treatment service logic plays the center role in the call processing logic. It decides upon the terminating terminal that the action is taken upon. During its searching for terminating terminal, it interacts with all kinds of SLPs to receive outside instruction for routing the call destination. Personal Routing Service (Pservice) and Automatic Call Distribution Service (ACDService) are two most important routing SLPs that are able to change JTAPI routing decision. The interaction between call control agent and other call routing services are implemented as shared object and ECA rules. During routing to the destination, the terminating call treatment service logic also does circular routing check at every step to prevent endless circular routing.

Additionally, the call control agent 86 may access the network routing logic 100 to determine how to route the call as well as to determine the termination address of the participants. The network routing service logic selects the gateways if the destination is outside the current IMA domain. It manages the topology of available trunk gateways and close numbering gateways. When the terminating call treatment service logic can not locate the terminal in the current domain base on the destination information, it consults the network routing service logic to allocate a gateway terminal to place the call. The network routing service logic also reclaims the gateway terminals when the call is finished.

Lastly, the call control agent 86 updates the conference call object 88 so that it reflects the available participants and then passes it to the call resource management agent 102.

The call resource management agent 102 processes the conference call object 88 passed by the call control agent 86. In particular, the call resource management agent 102 invokes operations in various resource control agents in order to establish a physical connection with each user's telephony device. For instance, a line agent 104 may be used to allocate the available line devices needed to establish the conference call. The call resource management agent 102 may also monitor the status of the telephony devices and register any changes in their status with the call control agent 86.

For illustration purposes, the call resource management agent 102 is also shown accessing a common service agent. In this case, a directory agent 106 services directory requests from the call resource management agent 102. For example, the directory agent 106 may provide the phone number for a conventional telephone handset or an IP address for a computing terminal.

The above-described telephony call model fully utilizes the shared object architecture. The call control agent creates the IMACall object as a shared object and exports it into the common service agent. Other agents, like call resource management agent and resource control agent, plugs their own ECA rules (i.e., small executable routines) in the common service agent to observe any state change of the shared IMACall object.

The call control agent evokes ECA rules by issuing standard JTAPI events. When a new call event is fired, the call control agent notifies the common service (SOService), which in turn automatically executes the ECA routines registered on the shared IMACall object. The ECA routines analyse the event and may also get additional information from the shared IMACall object. It is up to the build ECA logic to decide to notify the master agents that plug the ECA rules in. By adopting the shared object and ECA notification architecture, the call control agent minimizes its direct interface with peer agents, yet keeps a powerful communication channel open for collaboration with other agents.

The call control agent implements the industry standard JTAPI interface. This interface allows call control agent to provide its service to any JTAPI compatible software. Internally the JTAPI request are converted into IMAEvents and sent to the call control agent to process.

This example shows that the telephony call system of the present invention supports a high degree of programmability. It supports the dynamic upgrade of service processing agent. The telephony call system also supports dynamic upgrade of service logic. Different types of conference call agents can be created and deployed independently and dynamically. New types of user agents can be designed to access a new conference agent for enhanced service features. Additionally, the user can modify the service definition object to change the behavior of the service dynamically. For example, the user can change the network routing service logic to implement a dynamic call routing service.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

APPENDIX A

A call object has two basic properties: goalState and actualState. These two properties define the goal state and actual physical state of all the resources involved in the call. The call object is represented as a node connecting to multiple named users via logical communication links. Each participating user is a registered entity that is known to the system in a global directory.

```
CallObj{
    IMAEntity CallID,
    IMAEntity MasterUserAgentID
    IMAEntity OriginatingParty
    IMAEntity BillableParty
GoalVector[] (
    String mediatype,
    IMAEntity addressID,
    IMAEntity terminalID); /*goal state*/
SLPVector[] (string mediatype,
    IMAEntity addressID,
    IMAEntity terminalID); /*vector after the SLP processing*/
ActualStatusVector[] (
    [Bridge/TerminalStatus/Address,
    LinkStatus,
    TerminalStatus/AddressStatus], Bridge); /*actual status that is to be maintained by CRM*/
URLVector[](
    IMAEntity SharedURL, ); /*The IMA entity contains the owner and creation time of the shared URL including the body of the URL object. */
short SetMediaType(string mediatype, int index);
short SetAddress(IMAEntity AddressID, int index);
short SetTerminal(IMAEntity terminalclass, int index);
string GetBridge(int index);
string GetTerminal(int index);
string GetAddress(int index);
string GetLink(int index);
short GetBridgeStatus(int index);
short GetTerminalStatus(int index);
short GetAddressStatus(int index);
short GetLinkStatus(int index);
int AddMediaType(string mediatype); /* return index
    /*
short DropMediaType(int index);
int AddAddress(IMAEntity addressID); /* return index
    /*
short DropAddress(int index);
int AddTerminal(IMAEntity terminalID); /* return index
    /*
short DropTerminal(int index); }
```

The media type specifies the kind of media that needs to be carried between the terminals. For example, the media type may be H.323 voice-over-IP or a public switched telephone network call. The address may be one of the following types: conference name, email id, phone number or IP address; whereas the terminal class may include H. 323 terminal, POT, or PBX. It is envisioned that other types of media, addresses and terminals may be supported by the software architecture of the present invention.

The call resource management agent decides how to establish the connection based on media type, address, and terminal. Different types of communication links that can be used to connect the terminals are as follows:
  PSTN Trunk: link to a central office or the station port of a PBX;
  External IP Channel: channel to IP gateway;
  Internal IP Channel: connection to a local endpoint attached to the ACD server;
  External PBX extension: connection to a PBX phone via an external PBX switch; and
  Internal SCBus connection: connection via an internal switch.

The invention claimed is:

1. An agent-based integrated multimedia communication system architecture and execution model running in an automatic call distribution server interfaced with an IP switching system and gateway of a circuit switched telephony network, the multimedia communication system architecture comprising:
  (a) a set of Web attendant agents for processing incoming call requests from external calls or calls initiated by an Attendant in a client device:
  (b) an application server having:
    (i) a call control agent for processing call requests from at least one of the telephony network or the web attendant agents;
    (ii) a call resource management agent in communication with the call control agent for allocating and controlling resources needed to establish a call between telephony devices;
    (ii) a set of media agents for controlling media (voice/video) communication channels and supporting web oriented multimedia services, including one or more of email, video streaming, and Web browsing; and
    (iii) a set of resource control agents running in a resource server in communication with the call resource management agent for providing a hardware-dependent interface to the telephony devices;

(c) a common service server that includes:
  (i) a directory agent for maintaining a dynamically configurable users and devices, telephone numbers and addresses, and external directories for outgoing calls:
  (ii) a resource pool management agent for providing fast allocation of available resources to the call control agent; and
  (iii) a message queue agent for storing scheduled requests, call messages, and other notification events needed to support asynchronous operations;
wherein in accordance with the execution model:
(a) members of said set of agents minimize their direct interfaces to each other by dynamically plugging their own Event, Condition, and Action (ECA) rules into a shared multimedia call object containing:
  (i) goal state defined in a multimedia call request;
  (ii) actual status of device availability and connectivity;
  (iii) links to a set of service logic programs (SLPs);
  (iv) methods to evaluate ECA rules and execute actions to send notification to agents, and allocate resources needed to set up connections using at least one of desired media or alternative media;
(b) a set of service definition objects defines service logic of different service features to allow users to modify parameters of service features using a service editor during the course of a call, wherein a service definition object is one or more service logic programs (SLPs) including one or more of: originator call treatment (OCTSL) such as call screening; network routing service treatment (NRST) such as alternate routing; or terminating call treatment (TCTSL) such as follow me services;
(c) SLPs are dynamically linked and loaded to the system, wherein one or more of the SLPs contain ECA rules and a run time interface to allow users to change service parameters;
(d) call control agents create call objects for each call request from Web attendant agents and incoming call requests, and access SLPs for ongoing call treatments dynamically;
(e) the resource control agent reports the actual status of the resource control agent to the call resource management agent, which in turn updates a resource state in the call object;
(f) binding of call control agent, call resource management agent, line agent, SLP, and web attendant agent is dynamically constructed by checking the ECA rules associated with the call to determine a set of actions to be dispatched to a set of agents that is interested in event and state changes in the call object,
wherein, based on the architecture and execution model, the Web telephony call model implements an integrated multimedia conference call that has multiple independent call treatments for participants of the conference in an on going basis at the same time, call processing logic is not fixed in the ACD server, agents can change and modify a desired call state by directly changing a goal of the call objects, and new call object extensions can be added dynamically to support adding new devices and new users to the call objects.

2. The architecture and execution model of claim 1 wherein Web attendant agent launches multiple ECA rules to multiple call objects so that it can monitor changes and receive events of interest from the multiple call objects.

3. The architecture and execution model of claim 1 wherein a set of ECA rules associated with the call object are adapted to trigger the execution of the call resource management agent to invoke a resource control agent, the rules containing methods for invoking a hardware function remotely, the methods including messages conforming a protocol for a device.

4. The architecture and execution model of claim 1 wherein the call control agent, the call resource management agent and the resource control agent each execute as a different thread in a multi-threaded environment, communication between agents being indirectly bound by an ECA plug-in allowing different types of conference agents to be created and run in a single system to allow for incremental creation of new conference features using new types of agents while sharing a single call model.

5. The architecture and execution model of claim 1 wherein an automated call dispatch server is adapted for coupling to a telephone network and at least one of the telephony devices is further defined as a telephone handset, the call control agent being capable of adapting to a circumstance in which, based on time or other resource status information on a terminal, telephone network, and availability of a Web attendant agent, part of an active conference call cannot be created or processed successfully, the call control agent adapting to the circumstance by queuing an incomplete part of the call to a call queue, the call queue being configured to ensure that when the time expires, the resource becomes available, or the Web attendant agent becomes available, the incomplete part of the call is reactivated in order to try and complete the call, and adaptation of the call control agent does not need to hold the call control agent indefinitely and can adapt to various kind of intermittent failure, busy, and maintenance activities to enhance robustness of call processing.

6. The architecture and execution model of claim 1 wherein an automated call dispatch server is adapted for coupling to a computer network and at least one of the telephony devices is further defined as an IP-based computing device connected to the computer network, the IP device being one or more of an Instant Messaging terminal which has multimedia capability, an H.323 terminal, or an SIP (Simple Internet Protocol Phone) phone, the IP device using the resource management agents to connect to the call object and interact with other agents through ECA.

7. The architecture and execution model of claim 6 wherein the IP-based computing device is operative to establish a Voice over Internet Protocol (VoIP) call through the use of the automated call dispatch server, wherein a dispatcher also can establish one or more of a chat session, a video session, or combinations of other communication channels.

8. The architecture and execution model of claim 7 further comprises a web-attendant agent for providing user interface functions to control the VoIP call from the IP-based computing device, wherein the dispatch server is adaptive to user controls and resource changes by using the SLP (service logic program) (OC, TC, NR) to continue monitoring the call state and the resource status, termination logic can provide a list of available Web agents for originating logic to select, a user through a Web attendant interface can observe the call object and can reconnect or redirect a call to another agent when there is a problem with a current VoIP connection with a current agent by using a GUI to manipulate the service definition object, it is not necessary to create new calls so that existing context established between a call will be lost, and the context can be a chat session stored between the originating party and destination party.

9. The architecture and execution model of claim 1, wherein said architecture and execution model integrates an office computer network and telephony network with multimedia applications, including all of the following media: (a) voice/video over Internet; (b) instant messaging; (c) Web pages; and (d) conventional telephony functions.

10. The architecture and execution model of claim 1, wherein said call control agent and said call resource management agent are protocol independent, said resource control agent including a protocol independent web attendant agent and a protocol independent line agent.

11. The architecture and execution model of claim 10, the architecture and execution model further comprising common agents including one or more of: a directory agent, a resource pool agent, and a queue agent.

12. The architecture and execution model of claim 1, wherein said agents are organized in layers of abstraction invoking originating, terminating, and network routing logic to interact with a shared cell object and dynamically set up and alter multimedia communications using the Internet and conventional telephone.

13. The architecture and execution model of claim 1, wherein said agents are dynamically linked with SLP and call objects that encapsulate methods and attributes provided by said resource management agent and said resource control agent.

14. The architecture and execution model of claim 1, wherein said call control agent is separated from said resource management agent and said resource control agent, thereby providing flexibility for adaptation to various types of conventional and IP related devices.

* * * * *